Patented May 3, 1938

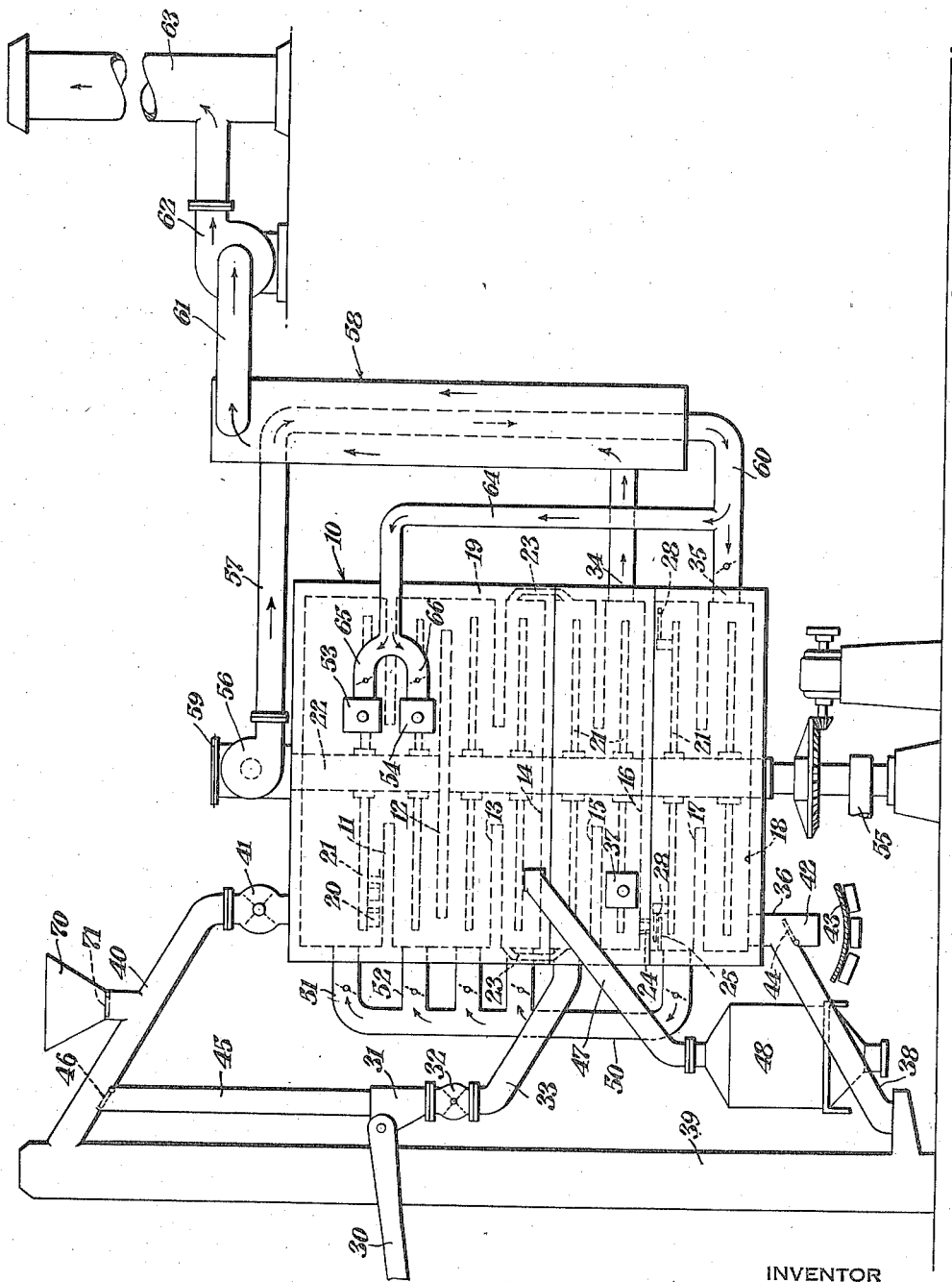

2,116,059

UNITED STATES PATENT OFFICE 2,116,059

DRYING AND BURNING OF MOIST MATERIAL

George E. Connolly, Oakland, Calif., assignor to Nichols Engineering & Research Corporation, New York, N. Y., a corporation of Delaware Application October 22, 1936, Serial No. 106,946
Renewed August 28, 1937

11 Claims. (Cl. 110—12)

This invention relates to the drying and burning of moist materials and is particularly adapted to the treatment of sewage sludge filter cake or the like waste materials in order to incinerate the same, or to efficiently and thoroughly dry portions of the same so that the resulting product may be used for fertilizer, for example.

The objects of the invention include the provision of means and methods for efficiently burning moist material, such as sewage sludge, to eliminate substantially all of the organic matter therefrom, leaving a finely divided ash while at the same time substantially eliminating noxious odors from the evolved vapor and gaseous products of combustion, these operations preferably being conducted with the use of little or no extraneous fuel and with an apparatus adapted to an unusually flexible degree for treating a variety of different waste materials to either incinerate the same or to dry the material for use as fertilizer or fuel.

An important phase of the invention relates to a furnace and associated apparatus, such furnace having three sections, each section including one or more zones and arranged whereby the moist material to be treated may be preliminarily dried in one section, more thoroughly dried without burning in another section, and finally either all or desired portions of the material being incinerated in the third section.

Various further and more specific objects, features and advantages will clearly appear from the detailed description given below, taken in connection with the accompanying drawing which forms a part of this specification and illustrates, merely by way of example, one embodiment of the apparatus of the invention.

The drawing illustrates somewhat diagrammatically a preferred embodiment of the invention. The apparatus there shown may comprise a furnace 10 having a plurality of superposed hearths as at 11 to 18 inclusive, supported and enclosed by a cylindrical outer furnace wall 19. Hearths 11 to 13 inclusive, as indicated, may be alternately provided respectively with central and periperal discharge openings permitting the material to be treated, to drop from hearth to hearth, the material being rabbled over each hearth as by rabble teeth 20 mounted upon rabble arms as at 21, the rabble arms being in turn mounted upon a rotatable central shaft as at 22. The hearth 14 at the mid portion of the furnace as shown, is preferably formed without drop holes, so that the solid material being treated does not pass through this hearth. However, this hearth may be by-passed by one or more relatively restricted gas ports or cavities as at 23, permitting gases from the upper hearths to pass hearth 14 to the space above the hearth 15. The hearth 15 as indicated, may be provided with a central drop hole or port. The hearth 16 is preferably formed with one or more drop holes or ports as at 24, arranged in such manner that the solid material being treated may be fed therethrough at a predetermined rate, but without however permitting any substantial amount of gas or air to pass. To this end the drop holes as at 24 may be accompanied by arrangements such as disclosed in the patent to Henry J. Hartley, No. 1,768,465, granted June 24, 1930. As here indicated, this arrangement may comprise a shelf as at 25 mounted beneath each of the drop holes 24, whereby a pile of the material being treated will accumulate on such shelf to an extent sufficient to block the drop hole above the shelf against passage of the gases therethrough. In order to periodically feed the material from the shelf at a predetermined rate, one or more of the rabble arms just above hearth 17 may be provided with a feeding arm or the like as at 28. Thus with each revolution of a rabble arm carrying a feeding arm 28, a predetermined quantity of the material on the shelf 25 will be thrust off the shelf to the hearth below, but ordinarily sufficient material will remain on the shelf to more or less seal the adjacent drop hole at least to an extent sufficient to prevent any rush of air or gases therethrough. The hearth 17 as indicated, may be provided with a central discharge port or drop hole.

Thus hearths 14 and 16 are such as to separate the furnace into three sections and as will be hereinafter explained. The upper section comprising hearths 11 to 14 inclusive, is adapted for burning the moist material; the middle section comprising hearths 15 and 16, is adapted for preliminarily drying the relatively wet material, and the lower section comprising hearths 17 and 18, is adapted for more thoroughly drying the material without scorching or burning thereof.

Except for the features otherwise noted, the hearth and rabbling system may be of a construction generally similar to that disclosed in the patent to Dudley Baird and Robert W. Rowen, No. 2,015,050, granted September 17, 1935.

The material to be treated may be discharged from a conveyor 30 into a hopper as at 31 and thence through an inlet feeding device as at 32 adapted to substantially continuously feed the material into the furnace, but substantially preventing the escape of gases from the furnace at this point. From the device 32, the material may be passed through a conduit or chute 33 into the furnace and on to hearth 15. The rabbling structure will cause the material to be agitated and gradually advanced, over this and the succeeding hearths down through the lower two sections of the furnace, the material being spread out as a relatively thin horizontal layer on each hearth, whereby extended surfaces of the material are exposed to hot streams of air, gases or vapor passing over these hearths in a manner hereinafter explained.

The temperature necessary for the preliminary drying of the wet material on hearths 15 and 16 may ordinarily be secured by causing hot gaseous products of combustion, vapor and some air from the upper burning section of the furnace, to flow down through the cavities or ports 23, thence along the path of travel of the material on hearths 15 and 16, and then out from the furnace through a gas exit conduit 34. Since the gases and vapor introduced on to these hearths through cavities 23 will have just passed through the high temperature burning zones, such gases and vapor will also have been freed of noxious odors, and the mixture of gases, vapor (and any remaining air not used for combustion purposes at the burning hearths) as it passes out through the exit conduit 34, will be at a sufficiently high temperature to substantially eliminate the noxious odors therefrom. If necessary, such as at times when the material being treated may have an unusually large moisture content, or when excessive volumes of the material are introduced into the furnace from time to time, the temperature within the upper drying section of the furnace may be increased by the use of one or more oil or gas burners as at 37 for projecting a flame into this section of the furnace.

After the material is preliminarily dried within the middle section of the furnace, it may be fed at a predetermined rate as above explained, through openings such as at 24, through hearth 16, and thence into the lower section of the furnace where the drying operation is carried to a further degree. Inasmuch as the material as it arrives in the lower section of the furnace is partially dried, it will be considerably more susceptible to combustion, and in order to avoid scorching or burning of the material in the lower section, this section is preferably maintained at a lower temperature than the middle section. As the material is rabbled over hearths 17 and 18, it may be gradually advanced counter current to streams of preheated air supplied through an inlet 35, in a manner hereinafter explained. Inasmuch as large proportions of the moisture are withdrawn from the material in the form of vapor at the middle section of the furnace, and such vapor is prevented from passing through hearth 16, an atmosphere in the lower section of the furnace will be maintained with a large percentage of hot air, so that the drying action in this section will be quite intense and efficient, and the material will be effectively dried before it is finally rabbled out through an exit opening as at 36. The dried material passing out of the furnace through outlet 36 may be conducted by a conduit or chute as at 38 into the lower end of a conveyor 39. The material is then carried to the top of the conveyor where it may slide down through a conduit or chute 40 through an inlet feeding device as at 41 on to the top hearth 11 within the burning section of the furnace. The feeding device 41 may be similar in construction to the feeding device 32 above described.

If desired, some of the dried material passing through outlet 36 or at times all of such material, may be allowed to fall through a conduit as at 42 on to a conveyor 43 for carrying the material away for use as fertilizer or fuel. The proportion of the dried material thus withdrawn from the apparatus may be varied by adjusting a gate member as at 44.

Under some circumstances, it may be possible to reduce the size or number of the drying hearths by recirculating a portion of the dried material back over the drying hearths, or such a step may be taken to insure more thorough drying of the material before it is introduced into the burning section of the furnace. For this purpose a chute or conduit as at 45 may be provided and extending from chute 40 into hopper 31. The proportion of the dried material which is recirculated back through the drying hearths through chute 45, may be varied by adjusting a gate member as at 46.

The dried material falling on the upper burning hearth 11 is rabbled over this hearth and the succeeding burning hearths in succession and downwardly through this section of the furnace, preferably along the path of travel of streams of hot air, vapor and gaseous products of combustion as hereinafter explained. In passing over these hearths, the material will be efficiently and uniformly burned or incinerated with the production of a finely divided ash free of organic matter. This ash may be finally rabbled from hearth 14 through a conduit or chute 47 to an ash storage bin as at 48.

The heated air which has passed through the lower drying section of the furnace, together with such vapor as is accumulated by this air, may pass out of the lower furnace section through a conduit at 50, thence through conduits as at 51, 52, etc., into the spaces above the various burning hearths. The rate at which this air and vapor and the proportion thereof which is admitted at each burning hearth, may be varied by adjusting the dampers as indicated in conduits 50, 51, 52, etc. A relatively small amount of vapor will be thus introduced into the burning section of the furnace, since much of the vapor evolved from the drying material will have been withdrawn through gas exit conduit 34. Accordingly, the heated air introduced into the burning section will not embody sufficient moisture to seriously interfere with conditions favoring rapid combustion at the burning hearths. The hot air introduced into the burning section through conduits 51, 52, etc., passes over the burning material on each of the burning hearths in succession and downwardly through the burning section and such air as is not used for combustion, together with the evolved gaseous products of combustion, then pass through the cavities or ports 23 to the upper drying section as above explained.

In case the material being incinerated does not embody a sufficient heat value to enable the process to be self-sustaining without extraneous fuel, then one or more oil or gas burners may be provided as at 53 and 54 at various burning hearths. In many cases, however, the waste material being incinerated, such as sewage sludge filter cake, will embody sufficient fuel value which in view of the economizing features hereinafter explained, will enable the process to be carried on for considerable periods once the furnace is brought up to temperature, without using the burners.

A supply of air for the furnace may be drawn into the bottom of the rotatable shaft 22 through an inlet opening as at 55. This air may then pass up through cooling conduits within the rabbling system in a manner such as disclosed in the above mentioned Patent 2,015,050. A suction fan 56 may be provided at the top of the shaft 22 for thus drawing the air through the rabbling system and for forcing this air after being preheated in the rabbling system, through a conduit 57 to a recuperator 58. If desired, additional quantities of air may be drawn into the system by the fan 56 through a butterfly valve 59 or the like, located adjacent the fan. The exit gases from the outlet 34 may also be conducted into the recuperator 58 in heat exchanging relationship with the air entering the recuperator through conduit 57. Thus, this air supply will become further preheated and may be conducted through a conduit as at 60 into the lower section of the furnace as above stated. Meanwhile, the exit gases after passage through recuperator 58, may be conducted through a conduit 61, suction fan 62 and thence to a stack 63 or equivalent means for disposal of the gases.

If desired, a portion of the preheated air in conduit 60 may be conducted as by conduits 64, 65, and 66 to the burners 53 and 54, to provide a supply of preheated air to insure efficient combustion of the fuel at these burners. The amount of air supplied to each burner may be varied by adjusting dampers as indicated in the conduits 65 and 66.

With the above described arrangement it will be observed that the hot gaseous products of combustion after leaving the burning section of the furnace through ports or cavities 23, are efficiently utilized for several purposes. That is, these hot gases serve to preliminarily dry the wet material within the upper drying section of the furnace and in so doing, such gases provide an atmosphere embodying such a small percentage of air that the danger of combustion of the wet material is avoided within this section and with the absence of scorching or smoldering of the wet material, the likelihood of causing obnoxious gases to pass out through the gas exit 34 and thence later to the atmosphere, is eliminated. It will be further noted that the useful heat of the combustion gases leaving the burning section of the furnace, is efficiently recovered at two stages, i. e., first a considerable portion of such heat is absorbed in preliminarily drying the moist material on hearths 15 and 16, and secondly, most of the remaining useful heat of these gases is absorbed because of their passage through the recuperator 58. Since it is not desired to maintain the temperatures in the lower drying section of the furnace as high as the temperatures to which the more moist sludge is subjected, the gases passing through exit conduit 34 are still at a temperature sufficient to adequately heat in the recuperator 58 the air admitted to the lower section of the furnace.

If sewage sludge is to be dried or burned in the above described apparatus, it may first be preferably treated so as to eliminate a considerable portion of the water content, for example by any well-known mechanical dehydrating process. The apparatus is particularly adapted for the drying or burning of sewage sludge which has been passed through a rotary vacuum drum filter, so that the material is introduced into the furnace in the form of relatively thin chunks of filter cake which crumble into finely divided form on being rabbled and dried in the apparatus. The apparatus is also adaptable for the treatment of garbage, particularly after the same has been suitably ground, or for garbage mixed with sewage sludge or other waste material. The material as introduced into the apparatus may have a water content as high as from 75% to 90% and still be quite thoroughly dried or dried and incinerated.

In some cases instead of using oil or gas burners to heat the furnace, or instead of relying wholly on such burners to provide any extraneous fuel necessary, it may be found desirable to provide fuel in finely divided solid form. In that event a finely divided fuel such for example as powdered coal, sawdust or other fuel which may be cheaply available, may be mixed with the waste material and carried into the apparatus with the waste material on conveyor 36. However, in the event that it is desired to use a portion of the dried waste material as fertilizer, then the finely divided fuel material may be mixed with the remaining waste material after the latter has become dried. That is, for example, powdered coal or other finely divided fuel may be supplied as from a hopper 70 through an adjustable gate 71 into the chute or conduit 40. The introduction of the finely divided fuel at this point not only has the advantage of permitting portions of the dried material to be withdrawn from the apparatus for use as fertilizer free of fuel or fuel ash, but also the fuel may thus be more uniformly and thoroughly mixed with the waste material after the latter has become quite thoroughly dried and finely divided. The introduction of the fuel at this point also avoids any possibility of the distillation of noxious gases from the fuel in the drying section of the furnace and eliminates any danger of unintended combustion occurring in the drying section. Furthermore, the mixing of the fuel with the dried waste material just before incineration, substantially avoids any possibility that the fuel will smolder and produce objectionable smoke, as might occur where the fuel is mixed with the wet sludge.

While in the particular example of the invention shown, two or more hearths are provided within each section of the furnace, it will be understood that under some circumstances if desired, only a single hearth need be provided in each furnace section. In that event the hearth of each section is made of sufficient area to accommodate the quantity of material being treated.

The conveyor 39 and the various chutes and conduits for conducting the material into and out of the furnace, are preferably suitably enclosed so as to prevent the escape of any odoriferous gases, vapor or dust.

Certain features herein disclosed are described and claimed in my copending application Serial No. 103,970, filed October 5, 1936, the following claims being directed to a species divisional from said earlier application.

What is here claimed as new and desired to be secured by Letters Patent of the United States is:

1. The method of drying and burning moist waste material which comprises passing the material in succession through three zones, the material being heated and preliminarily dried in the first zone, further dried in the second zone and incinerated in the third zone, the material being agitated and gradually advanced as a layer or succession of layers through each zone and from zone to zone, passing a stream of preheated air over the drying material within said second zone, then conducting such air together with vapor evolved from the material in said second zone into said third zone, maintaining temperatures in said third zone sufficient to burn the material therein and to substantially destroy any noxious odors of said vapor and of the gases evolved from the burning material, and conducting the hot vapor and gaseous products of combustion from said third zone into said first zone and over the material therein.

2. The method of drying and burning moist waste material which comprises passing the material in succession through three zones, the material being heated and preliminarily dried in the first zone, further dried in the second zone and incinerated in the third zone, the material being agitated and gradually advanced as a layer or succession of layers through each zone and from zone to zone, passing a stream of preheated air over the drying material within said second zone, then conducting such air together with vapor evolved from the material in said second zone into said third zone, maintaining temperatures in said third zone sufficient to burn the material therein and to substantially destroy any noxious odors of said vapor and of the gases evolved from the burning material, conducting the hot vapor and gaseous products of combustion from said third zone into said first zone and over the material therein, then withdrawing the vapor and gaseous products from said first zone, and utilizing heat thereof to heat said stream of preheated air for said second zone.

3. The method of drying and burning moist waste material which comprises passing the material in succession through three zones, the material being heated and preliminarily dried in the first zone, further dried in the second zone and incinerated in the third zone, the material being agitated and gradually advanced as a layer or succession of layers through each zone and from zone to zone, reintroducing into said first zone a part of the material leaving the second zone, passing a stream of preheated air over the drying material within said second zone, and then conducting such air together with vapor evolved from the material in said second zone into the presence of the material within said third and first zones.

4. The method of drying and burning moist waste material which comprises passing the material in succession through three zones, the material being heated and preliminarily dried in the first zone, further dried in the second zone and incinerated in the third zone, the material being agitated and gradually advanced as a layer or succession of layers through each zone and from zone to zone, reintroducing at least a portion of the material leaving said second zone for passage again through said first zone and second zone, utilizing hot gases from said third zone to promote said preliminary drying in the first zone, and utilizing a stream of preheated air to promote the drying action in said second zone.

5. Apparatus for drying and burning moist waste material, comprising a furnace having a plurality of superposed hearths, means for introducing the material on to a hearth or hearths intermediate between the upper and lower hearths, means for agitating and gradually advancing the material over said intermediate hearth or hearths for heating and preliminarily drying the material thereon and then over a lower hearth or hearths for further drying the material, means for conveying the dried material from said lower hearth or hearths to an upper hearth or hearths of the furnace, means for maintaining at said upper hearth or hearths temperatures sufficient to burn the material thereon, means for conducting hot gaseous products of combustion evolved from the burning material, from said upper hearth or hearths to said intermediate hearth or hearths to promote the drying action on said latter hearth or hearths, and means for conducting vapor evolved from the material on said lower hearth or hearths into the presence of the burning material on said upper hearth or hearths.

6. Apparatus for drying and burning moist material comprising a furnace having a plurality of superposed hearths, said furnace being divided into upper, intermediate and lower sections, each comprising one or more hearths, means between said upper and intermediate sections for preventing the passage of solid material being treated from said upper section into said intermediate section, and means between said intermediate and lower sections permitting said solid material to pass from said intermediate section to the lower section but substantially preventing the passage of gas or vapor from said intermediate section to the lower section, means for introducing the material into said intermediate section, means for then rabbling the material over the hearth or hearths in said intermediate section and then over the hearth or hearths in the lower section, means for conveying the material from said lower section to the hearth or hearths of the upper section, and means for then rabbling the material over the hearth or hearths of said upper section during the burning of the material.

7. Apparatus for drying and burning moist material comprising a furnace having a plurality of superposed hearths, said hearths being located respectively within three sections of the furnace including a first section for heating and preliminarily drying the material, a second section for further drying the material and a third section for burning the material, means for rabbling the material successively over the hearths of each of said sections and for advancing the material from one section to the next, means for applying a stream of heated air to the material within said second section, means for then conducting said air together with vapor evolved from the drying material in said second section into and through said third section, and means for then conducting the vapor from said third section together with gaseous products of combustion evolved from the burning material in said third section into and through said first section.

8. Apparatus for drying and burning moist material comprising a furnace having a plurality of superposed hearths, said hearths being located respectively within three sections of the furnace including a first section for heating and preliminarily drying the material, a second section for further drying the material and a third section for burning the material, means for rabbling the material successively over the hearths of each of said sections and for advancing the material from one section to the next, means for applying a stream of heated air to the material within said second section, means for then conducting said air together with vapor evolved from the drying material in said second section into and through said third section, means for then conducting the vapor from said third section together with gaseous products of combustion evolved from the burning material in said third section into and through said first section, and means for then utilizing the heat of said gases and vapor leaving the first section for preheating a supply of intake air for the furnace.

9. The method of drying and burning moist waste material which comprises passing the material in succession through three zones, the material being heated and preliminarily dried in the first zone, further dried in the second zone and incinerated in the third zone, reintroducing into said first zone a part of the material leaving the second zone, passing a stream of preheated air over the drying material within said second zone, and thereafter further heating said stream and subsequently conducting at least some of such air together with vapor evolved from the material in said second zone into the presence of the material within said first zone.

10. The method of drying and burning moist waste material which comprises passing the material in succession through three zones, the material being heated and preliminarily dried in the first zone, further dried in the second zone and incinerated in the third zone, reintroducing at least a portion of the material leaving said second zone for passage again through said first zone and second zone, utilizing hot gases from said third zone to promote said preliminary drying in the first zone, and utilizing a stream of preheated air to promote the drying action in said second zone.

11. The method of drying and burning moist waste material which comprises passing the material in succession through three zones, the material being heated and preliminarily dried in the first zone, further dried in the second zone and incinerated in the third zone, passing a stream of preheated air over the drying material within said second zone, then subjecting such air together with vapor evolved from the material in said second zone to heat evolved in said third zone to substantially destroy noxious odors of said vapor, and conducting gaseous products of combustion from said third zone to said first zone and over the material therein.

GEORGE E. CONNOLLY.